Patented Jan. 7, 1941

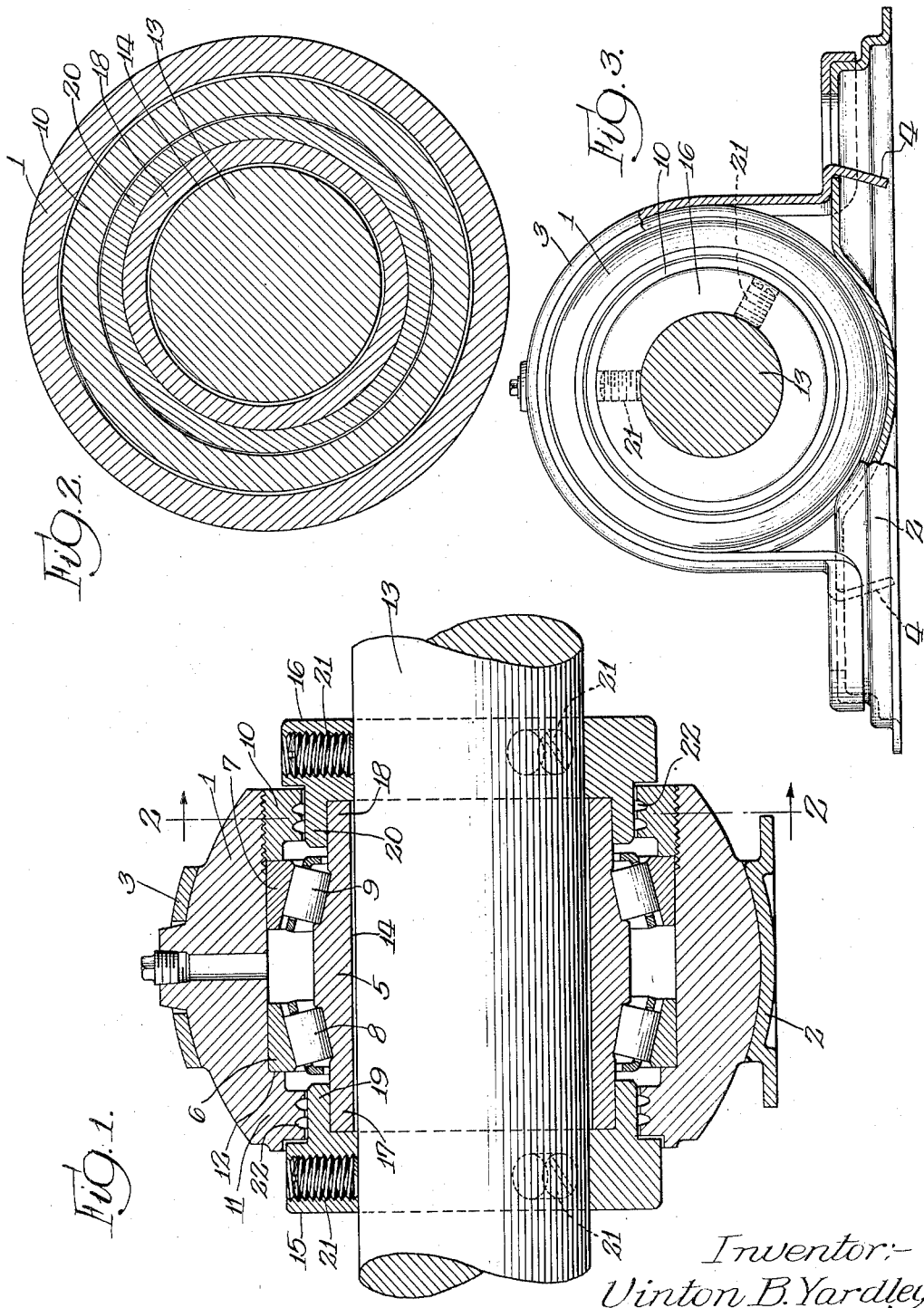

2,227,617

UNITED STATES PATENT OFFICE 2,227,617

SHAFT BEARING

Vinton B. Yardley, Mishawaka, Ind., assignor to Dodge Manufacturing Corporation, Mishawaka, Ind., a corporation of Indiana Application August 19, 1937, Serial No. 159,858

7 Claims. (Cl. 308—236)

This invention relates to shaft bearings of the class comprising an assembly which is applied to the shaft by slipping the bearing over the end of and along the shaft and securing it in position thereon by manipulation of attaching means.

An object of the invention is to provide a practicable construction for an antifriction shaft bearing by which it can be applied to a shaft without the employment of an interposed adapter sleeve or shaft bushing, and, on the other hand, without requiring a direct clamping of the inner race ring to the shaft.

The invention further contemplates an embodiment thereof in a shaft bearing of the duplex roller bearing type, in a specific organization of highly advantageous character, the construction in contemplation being susceptible of manufacture less expensively and with a less over-all dimension for a given shaft size than a similar bearing which is attached to the shaft by an adapter sleeve, and such less costly construction being practicable and desirable for a class of service not involving such speed and load conditions as to require the extreme degree of accuracy of concentricity between the shaft and bearing which the tapered adapter sleeve mounting, if accurately manufactured, may afford.

An illustrative shaft bearing structure embodying the invention in one practicable form is shown for example in the accompanying drawing, by reference to which the invention will be readily understood.

In said drawing:

Fig. 1 is a vertical sectional view of the illustrative shaft bearing structure, the section being taken longitudinally of the shaft;

Fig. 2 is a detail cross section taken through one of the end extensions of the inner race member of the bearing; and Fig. 3 is a front end view of said structure, the outer housing thereof being partially in section.

The illustrative structure comprises a duplex roller bearing mounted in an annular one piece housing 1 which has a ball and socket mounting in an outer housing to permit self-adjustment of the bearing to suit the shaft alignment. The outer housing shown is a strap type housing of the construction disclosed in United States patent to Carver No. 1,931,055 of October 17, 1933, the same comprising pressed metal base and cap members 2 and 3 separably connected by prongs 4 of the cap member resiliently engaging the base member, and the two members being secured together by the bolts or bolt screws (not shown) which attach the base member to its support, said bolts passing through registering openings in the base member and in the feet of the cap member. The ball and socket fit between the inner and outer housings, which have coacting spherical surfaces, may be considered as broadly typifying a movable mounting of the one within the other for self-adjustment of the position of the bearing, which movable mounting may be for angular or linear adjustment or both.

The specific roller bearing embodied in the illustrative structure is of the type disclosed in United States patent to Strong No. 1,877,206 of September 13, 1932. The elements of said bearing are a double cone ring 5, a pair of separate cup rings 6 and 7, and annular trains of rollers 8 and 9 bearing in said cup rings and on the cones of the double cone ring, said cones in this instance being the ground surfaces of races or grooves so that the annular trains of rollers are retained in proper relation to the double cone ring by engagement of the lateral walls of the races with the ends of the rollers. The bearing is assembled with the inner housing by insertion through its front or open end, in which is screwed a removable closure ring 10, also functioning as a bearing adjusting ring. The opposite end of the housing is flanged to provide the end wall 11. The cup ring 6 abuts against a thrust shoulder 12. A predetermined running clearance may be established between the roller bearing elements by screwing the adjusting ring 10 against the cup ring 7, the thrust being transmitted through the roller train 9, double cone ring 5, roller train 8 and cup ring 6 to the thrust shoulder 12 of the housing. The specific arrangement of the roller bearing elements, as shown in the drawing, is such that the two roller trains are near one another, and the outer bearing surfaces of the rollers, whose outer ends are further from the shaft axis than their inner ends, are approximately tangential to an imaginary sphere whose center is on the shaft axis at the center of the bearing: whereby, assuming an appropriate working clearance between the roller bearing elements, the bearing is capable of a micrometric self-adjustment to compensate for the minor fluctuations in the alignment of the shaft axis which occur in every individual revolution of the shaft at high speeds, while in event of occasional greater misalignment than that to which the bearing can respond in this manner the bearing as a whole can adapt itself by movement in the outer housing, as explained in said Strong patent.

A shaft extending through and supported by the illustrative bearing structure is designated in the drawing by the numeral 13. A clearance between the shaft and the double cone ring 5 is indicated at 14. This clearance may be more or less than as shown, the bearing being applicable to shafts of various diameters less than the inner diameter of the double cone ring, as well as to a shaft of approximately the same diameter as the bore of said ring and on which the latter may have a close slit fit. On the shaft, associated with the opposite ends of the double cone ring, are a pair of collars 15 and 16, whose bores are of a diameter to provide a close slip fit of said collars on the shaft. The shaft is supported from the roller bearing indirectly through said collars, the shaft, collars and double cone ring being rigidly connected and rotating as a unit in the surrounding support provided by the rolling bearing elements 8 and 9 and bearing housing 1.

The specific construction embodied in the illustrative structure for mounting the bearing on the shaft through said collars involves a rigid connection of said collars to the opposite ends of the double cone ring, with the bores of the collars in concentric relation to the bearing, by tightly interfitted end extensions of said collars and ring. As shown, the double cone ring 5 has integral cylindrical end extensions or sleeve portions 17 and 18, said ring being in effect a sleeve formed externally to provide a double bearing cone intermediate its end portions. The collars 15 and 16 have circular extensions or socketed portions 19 and 20 respectively, of greater interior diameter than the shaft bores of said collars and respectively enclosing the end extensions or sleeve portions 17 and 18 of said ring. Said sleeve portions or end extensions of the double cone ring are tightly fitted in and rigidly united with the surrounding portions or extensions 19, 20 of the collars, which may be accomplished by shrinking or pressing the latter on the former. The collar extensions or portions 19 and 20 are interiorly concentric with the shaft bores of the collars, so that, assuming accurate manufacture, the double cone ring 5 is supported concentrically with said shaft bores in the collars. Thus the double cone ring, rotating in the surrounding roller trains, carries the collars in rigid relation therewith, providing a bridge-like support of the shaft therefrom, the load on the bearing being transferred from the shaft through the collars and inner surfaces of their extensions 19 and 20 and outer surfaces of the ring extensions 17 and 18 and thence through the double cone to the roller trains.

For securing the double cone ring in rigid relation to the shaft, so as to avoid any objectionable longitudinal or rotational slippage of the inner bearing tracks or races relative to the rotating shaft, the collars 15 and 16 are shown equipped with set screws 21 engaging interiorly screw-threaded holes therefor in the collars and screwed therethrough against the shaft. Each collar may be fastened to the shaft by one or more of such set screws, but an arrangement considered the most desirable is that shown, in which each collar is clamped to the shaft by a pair of such set screws radially arranged with their axes at an angular distance of about 120° apart. The use of two set screws for each collar, arranged as stated, provides an effective fastening with distributed clamping action and with minimum distortion. While this type of fastening involves drawing the collar laterally to the shaft in a direction opposite the resultant of forces applied by the two set screws, the slight interference with theoretically exact concentricity between the shaft and bearing is not such but that the bearing is practicable for the class of service for which it is designed, i. e. for use under conditions such as to render desirable a duplex roller type of bearing, but not involving imposition of such loads and speeds as to require that precision of concentricity which is obtainable with a tapered adapter sleeve mounting, if accurately manufactured, and where therefore a more expensive bearing is not required. Furthermore, if desired, the collars may be fastened to the shaft each by three set screws arranged equal distances apart and adjusted when installing the bearing so as to obtain true concentricity between the shaft axis and the shaft bores of the collars.

The collars 15 and 16 may abut against the extended ends of the ring 5. The end walls 10 and 11 of the annular one-piece bearing housing 1 (the closure ring 10 being considered as one of said walls) surround the respective collar extensions 19 and 20, the collars and their extensions being however free from frictional engagement with the housing. To prevent escape of grease from the bearing, as well as to prevent entrance of foreign particles thereinto, suitable grease seals are provided between the ends of the housing, i. e. the walls 10 and 11, and the enclosed circular collar extensions 19 and 20. Various types of grease seals may be used. As shown, the inner peripheries of the ring 10 and end wall 11 are closely adjacent to the respective collar extensions 19 and 20 and are formed with a plurality of annular channels 22 which will gather and hold grease, providing effective seals. This simple type of grease seal is found quite satisfactory in practice.

The illustrative shaft bearing structure has all the advantageous features of that shown in the Strong patent, save with respect to the tapered adapter sleeve mode of mounting, and on the other hand lacks the disadvantages incident to that mode of mounting. As compared with the adapter sleeve mode of mounting, a shaft bearing having the construction hereinbefore described for the mounting of the bearing on the shaft can be manufactured more economically, and for a given shaft size can be of substantially less over-all diameter, permitting the use of substantially smaller bearing elements, including smaller bearing rollers, with resultant substantial decrease in manufacturing cost.

A shaft bearing having the described construction for the mounting of the bearing on the shaft, and securing its inner race ring in fixed relation thereto, is more economical to manufacture, in a construction for a given shaft size, than similar bearings employing either a tapered adapter sleeve or a clamp sleeve mounting with end clamping collars, and certain other types of mounting. It is also preferable from the standpoint of reducing the over-all diameter as compared with any construction involving the use of a sleeve or bushing between the shaft and inner race ring. The type of mounting herein described is also considered preferable to one which involves a tight driving fit of the inner race ring on the shaft, or one in which the inner race ring has a close slip fit on the shaft and is directly clamped thereto. A shaft bearing structure having the herein described type of mounting means may be applied to shafts of various diameters less than the inner diameter of the inner race ring, it only being necessary that the collars 15 and 16 should have a close slip fit on the shaft. This enables the manufacturer to carry a less number of sizes of bearings and parts in stock than in the case of constructions which must be of different sizes for different shafts. For example, the manufacturer or dealer may carry in stock shaft bearings of the illustrative construction suitable for one or more maximum shaft sizes, with shaft collars having shaft bores to suit different shaft sizes and which can be interchangeably used in a given structure. It will be observed that the two collars 15 and 16 are identical which of course is of advantage in manufacture and with respect to the number of parts to be carried in stock.

The double cone ring of the illustrative structure broadly typifies the inner race ring or member of any antifriction shaft bearing or shaft bearing structure in which may be embodied that feature of my invention which resides in the construction for the mounting of the bearing on the shaft and attachment of the inner race ring in fixed relation thereto. With respect to this feature of the invention, it may be embodied in various types of antifriction shaft bearings, whether having one or more annular rows of rolling elements, i. e. balls or rollers, or whether mounted with or without capacity for self-adjustment to respond to shaft expansion or to suit shaft alignment or both. The annular inner housing 1 may be considered as exemplifying the outer member of an antifriction bearing comprising concentric rings and interposed balls or rollers, the outer tracks therefor being provided in this instance in said annular member 1 by the separate cup rings 6 and 7 mounted thereon in fixed assembly therewith. While the double cone ring or inner race ring of the bearing is preferably a one-piece element, it may consist of a sleeve having the inner bearing track or tracks, race or races, formed as separate elements and rigidly affixed on said sleeve between its end portions.

While the illustrative structure has been described as one supporting a rotating shaft, it will be understood that the same structure or other like structures embodying the invention may be used for supporting a rotating member on a stationary shaft.

The term "rolling bearing elements" will be understood to include either balls or rollers, and an "antifriction bearing" will be understood to include one having either one or a plurality of rows of balls or rollers.

I claim as my invention:

1. In a slip-on shaft bearing comprising an annular antifriction bearing unit, the combination with the inner race ring thereof having extended load transferring sleeve end portions, of undivided one-piece load carrying collars permanently fast to the end portions of said race ring and having a close slip fit on the shaft, said collars having unsplit load transferring sleeve extensions tightly interfitting and rigidly joined with said sleeve end portions of the race ring, so that the collars and race ring become a unitary structure, and set screws for securing said collars to the shaft.

2. In a slip-on shaft bearing comprising an annular antifriction bearing unit, the combination with the inner race ring thereof having extended load transferring sleeve end portions, of shaft supporting collars having unsplit load transferring sleeve extensions contractibly binding and thereby rigidly joined with said sleeve end portions of said race ring in tight interfitting and intergripping engagement therewith, so that the collars and race ring become a unitary structure, said collars being undivided one-piece elements having a close slip fit on the shaft, and set screws for securing said collars to the shaft.

3. In a slip-on shaft bearing comprising an annular antifriction bearing unit, the combination with the inner race ring thereof having extended load transferring sleeve end portions, of shaft supporting collars having unsplit load transferring sleeve extensions shrunk on and thereby rigidly joined with said sleeve end portions of said race ring in tight interfitting and intergripping engagement therewith, so that the collars and race ring become a unitary structure, said collars being undivided one-piece elements having a close slip fit on the shaft, and set screws for securing said collars to the shaft.

4. In a slip-on shaft bearing comprising an annular antifriction bearing unit, the combination with the inner race ring thereof having extended load transferring sleeve end portions and a relatively thicker intermediate load carrying bearing portion and whose bore is of materially larger diameter than the shaft diameter, of shaft supporting collars having unsplit load transferring sleeve extensions tightly interfitting and rigidly joined with said sleeve end portions, so that the collars and race ring become a unitary structure, said collars being undivided one-piece elements having shaft bores materially smaller than the bore of the race ring, for a close slip fit of said collars on the shaft, and set screws for securing said collars to the shaft.

5. In a slip-on shaft bearing comprising an annular antifriction bearing unit, the combination with the inner race ring thereof having extended load transferring sleeve end portions and a relatively thicker intermediate load carrying bearing portion and whose bore is of materially larger diameter than the shaft diameter, of shaft supporting collars having unsplit load transferring sleeve extensions shrunk on and thereby rigidly joined with said sleeve end portions in tight interfitting and intergripping engagement therewith, so that the collars and race ring become a unitary structure, said collars being undivided one-piece elements having shaft bores materially smaller than the bore of the race ring, for a close slip fit of said collars on the shaft, and set screws for securing said collars to the shaft.

6. In a slip-on shaft bearing comprising an annular antifriction bearing unit, the combination with the inner race ring thereof having extended load transferring sleeve end portions and a relatively thicker intermediate load carrying bearing portion and whose bore is of materially larger diameter than the shaft diameter, of shaft supporting collars having unsplit load transferring sleeve extensions contractibly binding and thereby rigidly joined with said sleeve end portions in tight interfitting and intergripping engagement therewith, so that the collars and race ring become a unitary structure, said collars being undivided one-piece elements having shaft bores materially smaller than the bore of the race ring, for a close slip fit of said collars on the shaft, and set screws for securing said collars to the shaft.

7. In a slip-on shaft bearing comprising an annular antifriction bearing unit, the combination with the inner race ring thereof having extended load transferring sleeve end portions, of undivided one-piece load carrying collars permanently fast to the end portions of said race ring and having a close slip fit on the shaft, said collars and race ring having tightly interfitted rigidly united load transferring sleeve extensions the outer ones of which are shrunk on the inner ones in tight interfitting and intergripping engagement therewith, so that the collars and race ring become a unitary structure, and set screws for fastening said collars to the shaft.

VINTON B. YARDLEY.